United States Patent
Sakashita

(10) Patent No.: US 9,557,943 B2
(45) Date of Patent: Jan. 31, 2017

(54) PORTABLE COMMUNICATION DEVICE, IMAGE FORMING SYSTEM AND METHOD OF CONTROLLING PORTABLE COMMUNICATION DEVICE

(71) Applicant: KYOCERA Document Solutions Inc., Osaka (JP)

(72) Inventor: Fumiya Sakashita, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/961,168

(22) Filed: Dec. 7, 2015

(65) Prior Publication Data

US 2016/0170695 A1 Jun. 16, 2016

(30) Foreign Application Priority Data

Dec. 11, 2014 (JP) .................. 2014-251061

(51) Int. Cl.
| | |
|---|---|
| *G06F 3/12* | (2006.01) |
| *H04N 1/32* | (2006.01) |
| *G06K 9/00* | (2006.01) |
| *G06K 9/20* | (2006.01) |
| *G06K 9/22* | (2006.01) |

(52) U.S. Cl.
CPC ........... *G06F 3/1236* (2013.01); *G06F 3/1204* (2013.01); *G06F 3/1243* (2013.01); *G06F 3/1292* (2013.01); *G06F 3/1294* (2013.01); *G06K 9/00449* (2013.01); *G06K 9/2063* (2013.01);

(Continued)

(58) Field of Classification Search
None
See application file for complete search history.

(56) References Cited

U.S. PATENT DOCUMENTS

| | | | |
|---|---|---|---|
| 2001/0002851 A1 | 6/2001 | Shimada et al. ........... 348/423.1 |
| 2005/0022108 A1* | 1/2005 | Carro ................... G09B 21/001 |
| | | | 715/256 |

(Continued)

FOREIGN PATENT DOCUMENTS

| | | |
|---|---|---|
| JP | 10-91379 A | 4/1998 |
| JP | 2003-150797 A | 5/2003 |

(Continued)

OTHER PUBLICATIONS

Japanese Office Action dated Jul. 19, 2016, issued by the Japanese Patent Office in corresponding application JP 2014-251061.

*Primary Examiner* — Huo Long Chen
(74) *Attorney, Agent, or Firm* — Stein IP, LLC

(57) ABSTRACT

A portable communication device includes an image sensing portion, a display portion (display panel), a touch panel portion, a storage portion that stores personal information on a user, a wireless communication portion and a processing portion that recognizes an address included in a code display member by shooting the code display member, that makes the wireless communication portion acquire data in the address as data on an application form, that adds the personal information to the data acquired by the wireless communication portion to generate print data on the application form in which an item has been entered and that makes the wireless communication portion transmit the generated print data to an image forming apparatus.

9 Claims, 10 Drawing Sheets

(52) U.S. Cl.
CPC ........... *G06K 9/22* (2013.01); *H04N 1/32101* (2013.01); *H04N 2201/0094* (2013.01)

(56) References Cited

U.S. PATENT DOCUMENTS

| | | | |
|---|---|---|---|
| 2007/0019215 A1 | 1/2007 | Yu | |
| 2007/0030516 A1 | 2/2007 | Tsuji et al. | 358/1.15 |
| 2011/0271173 A1* | 11/2011 | Ait-Mokhtar | G06F 17/243 715/226 |
| 2012/0038948 A1* | 2/2012 | Park | G06F 3/1204 358/1.15 |
| 2012/0147420 A1* | 6/2012 | Nishimi | G06F 3/1204 358/1.15 |
| 2014/0185079 A1* | 7/2014 | Rhodus | H04M 1/72533 358/1.14 |
| 2015/0248391 A1* | 9/2015 | Watanabe | G06F 17/243 715/226 |

FOREIGN PATENT DOCUMENTS

| | | |
|---|---|---|
| JP | 2007-36404 A | 2/2007 |
| JP | 2007-49271 A | 2/2007 |
| JP | 2013-61607 A | 4/2013 |
| JP | 2014-186726 A | 10/2014 |

* cited by examiner

| ITEM | NAME | YAMADA TAROU | D1 |
| | ADDRESS | 1-1-1, OSAKA CITY, OSAKA | |
| | POSTAL CODE | 123-4567 | |
| | TELEPHONE NUMBER | 012-3456-7890 | |
| | ... | ... | |

PORTABLE COMMUNICATION DEVICE, IMAGE FORMING SYSTEM AND METHOD OF CONTROLLING PORTABLE COMMUNICATION DEVICE

This application is based upon and claims the benefit of priority from the corresponding Japanese Patent Application No. 2014-251061 filed on Dec. 11, 2014, the entire contents of which are incorporated herein by reference.

BACKGROUND

The present disclosure relates to a portable communication device that includes an image sensing portion and a display portion which displays the result of image sensing and that makes an image forming apparatus perform printing. The present disclosure also relates to an image forming system that includes such a portable communication device and an image forming apparatus.

Portable communication devices such as a smart phone and a tablet computer are widely used. Such a portable communication device is used to attempt to make an image forming apparatus such as a multifunctional machine, a copying machine or a printer more user-friendly. The following example of a technology in which a portable communication device and an image forming apparatus are coordinated is known.

An image forming system is known that includes: an image forming apparatus which converts setting information on the execution of a job into image data and which outputs the converted image data; and a portable terminal which can shoot the output image data, which can store the shot image data and which can output (display, print and transmit) the stored image data or the setting information indicated by the image data. In this configuration, the image forming apparatus outputs, as images such as QR codes, a plurality of pieces of setting information (registration programs) stored to deliver the pieces of setting information to the portable terminal.

In places where people gather, such as stores like a business convenience store and a convenience store, commercial facilities, public facilities and event venues, the brochures and advertisements of events and products may be provided. However, in some brochures and advertisements, only the outlines thereof are described without application forms of participation and purchase. In this case, additional bothersome actions are needed such as confirmations through the Internet, the acquisition of the application forms and the transmission of the application forms through facsimile. Hence, disadvantageously, it is impossible to immediately acquire an application form to submit the application form to a staff member in a store or a facility.

On the other hand, in the store or the facility described above, an image forming apparatus such as a copying machine or a multifunctional machine may be provided that can be utilized by paying some money. When an application form can be printed in the image forming apparatus provided, it is convenient for a user, and it is also possible to increase the frequency of utilization of the apparatus for the provider. However, at present, it is impossible to easily print an application form, and thus it is impossible to effectively utilize an image forming apparatus that is provided.

In the known technology described above, programs (data indicating a plurality of types of setting values) stored in the image forming apparatus can be delivered from the image forming apparatus to the portable terminal. However, it is impossible to immediately print the application form that is not present. Hence, it is impossible to solve the problem described above.

SUMMARY

A portable communication device according to one aspect of the present disclosure includes an image sensing portion, a display portion, a touch panel portion, a storage portion, a wireless communication portion and a processing portion. The display portion displays a screen. The touch panel portion receives a touch operation on the display portion. The storage portion stores personal information on the user of the portable communication device. The wireless communication portion transmits and receives data. The processing portion recognizes, based on image data generated by shooting a code display member with the image sensing portion, an address included in the code display member, makes the wireless communication portion acquire data in the address as data on an application form, adds the personal information to the data acquired by the wireless communication portion to generate print data on the application form in which an item has been entered and makes the wireless communication portion transmit the generated print data to the image forming apparatus.

Further features and advantages of the present disclosure will become apparent from the description of embodiments given below.

DETAILED DESCRIPTION

The present disclosure is intended to acquire data on an application form based on the details of a brochure or an advertisement, to add information on a user to the acquired data so as to reduce a bothersome action of writing, to make an image forming apparatus print the application form and to be able to immediately make the application. Hence, an embodiment of the present disclosure will be described below with reference to FIGS. 1 to 12. In this description, an image forming system 100 including a portable communication device 1 and a multifunctional peripheral 2 (which corresponds to an image forming apparatus) is used as an example. However, elements such as configurations and arrangements described in the present embodiment do not limit the scope of the disclosure and are simply illustrative.

(Schematic Configuration of Image Forming System 100)

Figure 1:
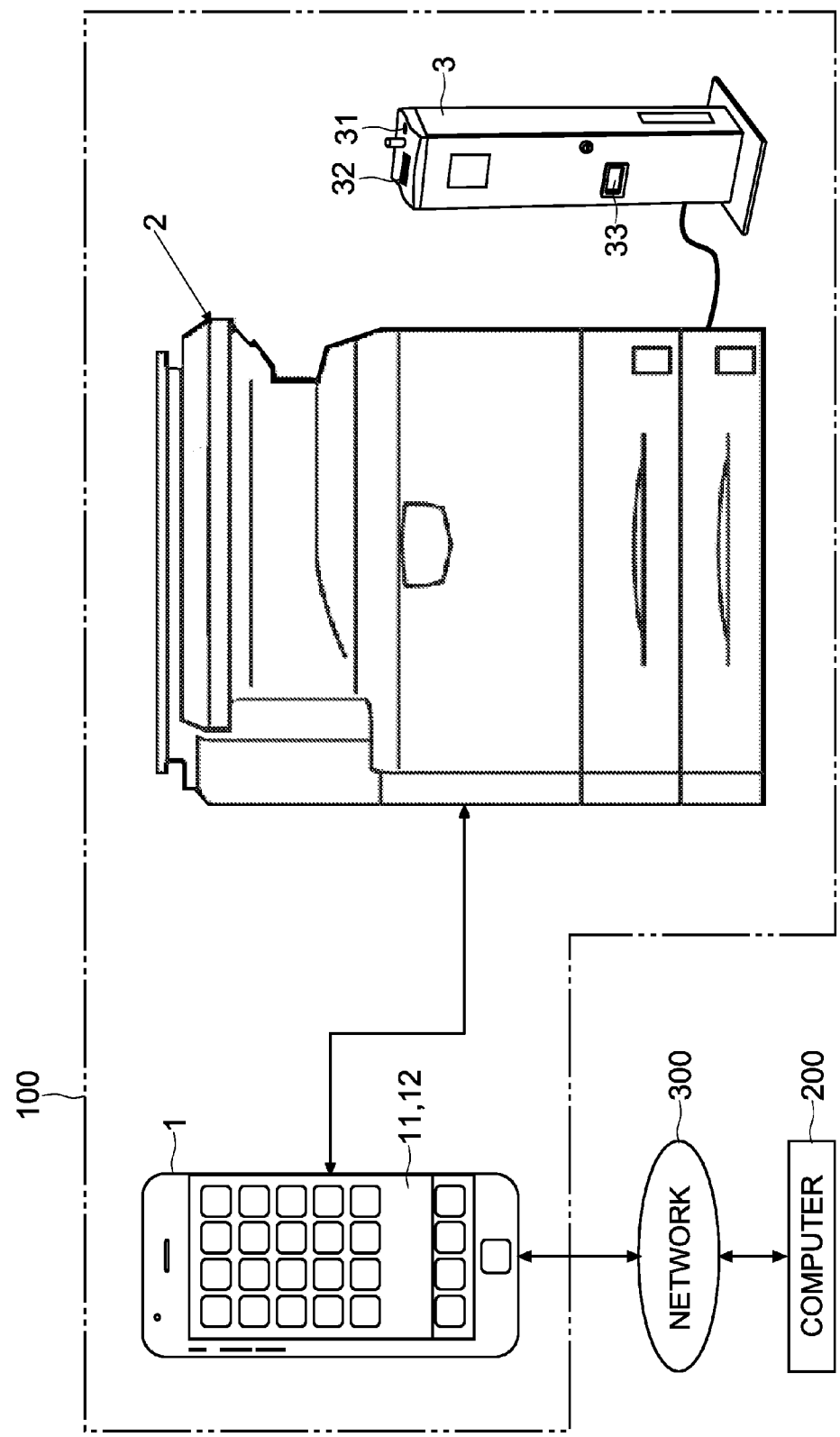
FIG. 1 is an illustrative diagram showing an example of an image forming system according to an embodiment.

An example of the schematic configuration of the image forming system 100 according to the embodiment will first be described with reference to FIG. 1.

The portable communication device 1 will first be described. As shown in FIG. 1, the portable communication device 1 of the present embodiment is a so-called smart phone. The portable communication device 1 is portable as with a tablet computer, and has a communication function.

The portable communication device 1 includes a display panel 11 (which corresponds to a display portion) such as a liquid crystal panel or an organic EL panel. Then, on the standby screen of the display panel 11, the icon of an application 4 used for utilization of the portable communication device 1 is displayed. The portable communication device 1 also includes a touch panel portion 12. A user touches the display panel 11 (the touch panel portion 12) and thereby can perform various operations. In the back surface side of the portable communication device 1, an image sensing portion 15 (camera) is provided (which cannot be seen in FIG. 1).

In the portable communication device 1, a telephone call can be made through a portable telephone network. In the portable communication device 1, a computer 200 such as a PC or a server is accessed through a network 300, and the application 4 and data for the portable communication device 1 can be downloaded.

In the portable communication device 1, based on image data on a QR code 5 (another type of code such as a barcode may be used) shot by the image sensing portion 15, an address (a linked destination) included in the QR code 5 is recognized. The user accesses the address included in the QR code 5 shot and thereby can recognize the result of the access on a screen displayed on the display panel 11. With the portable communication device 1, it is possible to download the application 4 for utilization of the image forming apparatus and the application 4 for the portable communication device 1.

The multifunctional peripheral 2 will then be described. FIG. 1 shows the multifunctional peripheral 2 that is provided in a store such as a business convenience store or a convenience store, a commercial facility, a public facility, an event venue or the like. In the multifunctional peripheral 2 shown in FIG. 1, a billing device 3 is attached so as to collect a fee. When it is not necessary to collect a fee, it is not necessary to provide the billing device 3.

In the billing device 3, a money inlet 31, a money amount display portion 32 that displays the total amount of money inserted and the like are provided. The user inserts money into the billing device 3. Then, the information that the money is inserted is transmitted from the billing device 3 to the multifunctional peripheral 2. Then, the multifunctional peripheral 2 is brought into a state where the multifunctional peripheral 2 can be used (a job such as printing can be executed). In the multifunctional peripheral 2, money is inserted into the billing device 3, and thus it is possible to make the multifunctional peripheral 2 perform printing based on print data received from the portable communication device 1 or image data obtained by the reading of an original document. When the job is executed, the money amount display portion 32 displays the remaining amount of money obtained by reducing the fee of the executed job. Then, when a settlement is made (the money is returned through a return slot 33) or when the amount of money inserted (the remaining money) becomes zero by the reduction of the remaining money through the execution of a job, the multifunctional peripheral 2 is brought into a state where it cannot be used.

(Schematic Configuration of Multifunctional Peripheral 2)

The multifunctional peripheral 2 according to the embodiment will then be described with reference to FIG. 2.

Figure 2:
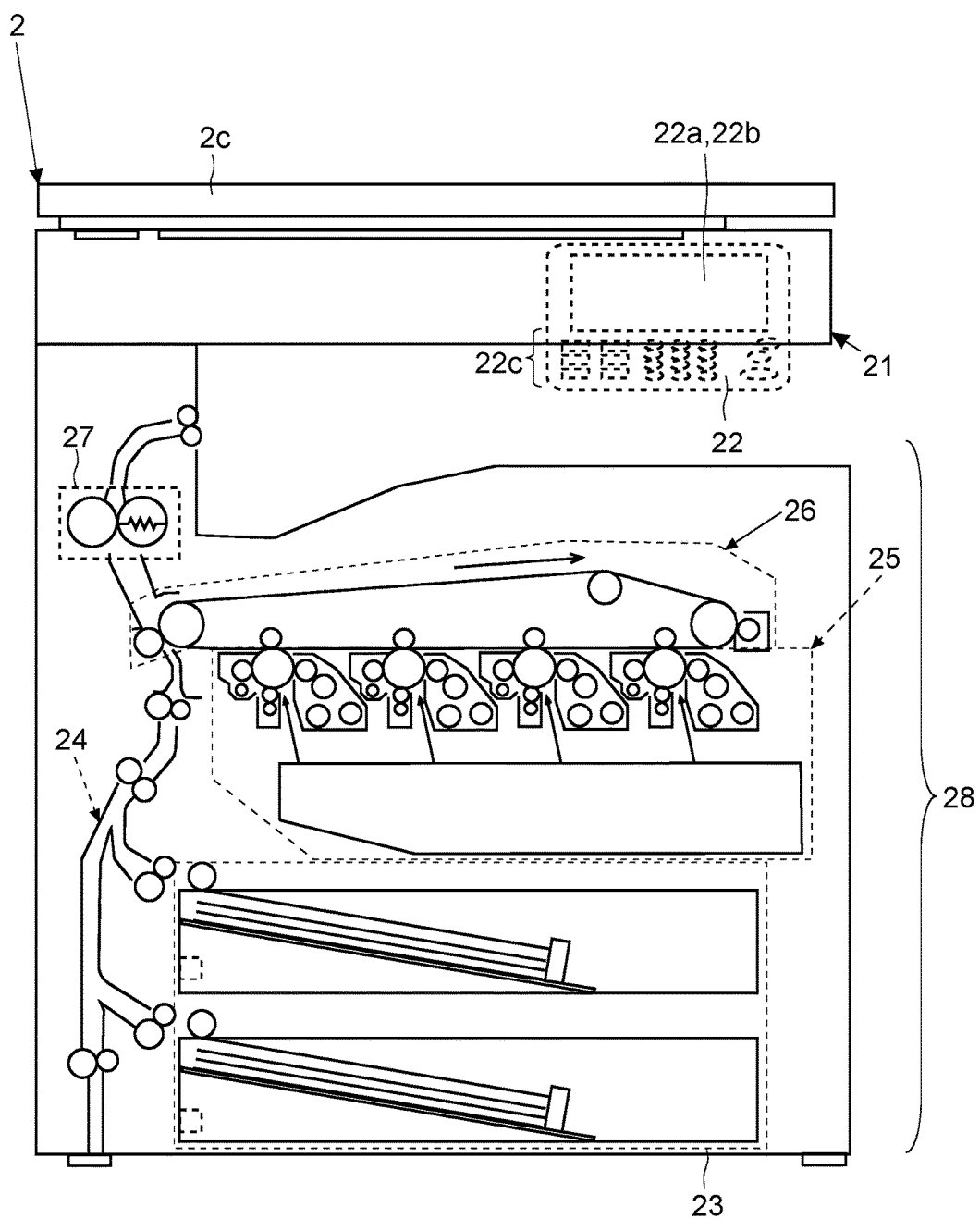
FIG. 2 is a diagram showing an example of the configuration of a multifunctional machine according to the embodiment.

As shown in FIG. 2, in the multifunctional peripheral 2 of the present embodiment, an original document cover 2c is provided in an uppermost portion, and an image reading portion 21 (scanner) is provided below it. In a front surface upper portion, an operation panel 22 is provided. Within a main body, a print portion 28 including a paper feed portion 23, a transport portion 24, an image formation portion 25, an intermediate transfer portion 26 and a fixing portion 27 is provided.

The operation panel 22 is provided in the front surface upper portion of the multifunctional peripheral 2. The operation panel 22 includes a liquid crystal display panel 22a that displays the state of the multifunctional peripheral 2 and various types of messages. The liquid crystal display panel 22a displays soft keys for selecting a function and a setting item, setting a setting value and inputting a character. In a touch panel portion 22b, a position (coordinates) of a part that is touched is detected. In the operation panel 22, hard keys 22c such as a start key for providing an instruction to start the execution of various types of functions such as copying and transmission and a numeric keypad 22c are also provided.

In the original document cover 2c, a pivot is provided on the back side of the plane of FIG. 2, and the original document cover 2c can be raised. Within the image reading portion 21, optical members (not shown) such as an exposure lamp, a mirror, a lens and a CCD image sensor are provided. The image reading portion 21 uses the optical members, applies light to the original document set, performs A/D conversion on an output value of each pixel of the image sensor receiving light reflected off the original document and generates image data. The multifunctional peripheral 2 can perform printing (copying function) based on the image data obtained by the reading.

The paper feed portion 23 feeds out a sheet to the transport portion 24. The transport portion 24 transports the sheet supplied from the paper feed portion 23. The image formation portion 25 forms a toner image based on the image data. The image formation portion 25 corresponds both to monochrome printing and to color printing. The intermediate transfer portion 26 primarily transfers a toner image of only black or toner images of individual colors superimposed to a belt, and transfers the superimposed toner images to the sheet. The fixing portion 27 heats and pressurizes the toner images secondarily transferred to the sheet to fix them. The sheet after the fixing is ejected, and the printing is completed.

(Hardware Configuration of Image Forming System 100)

Figure 3:
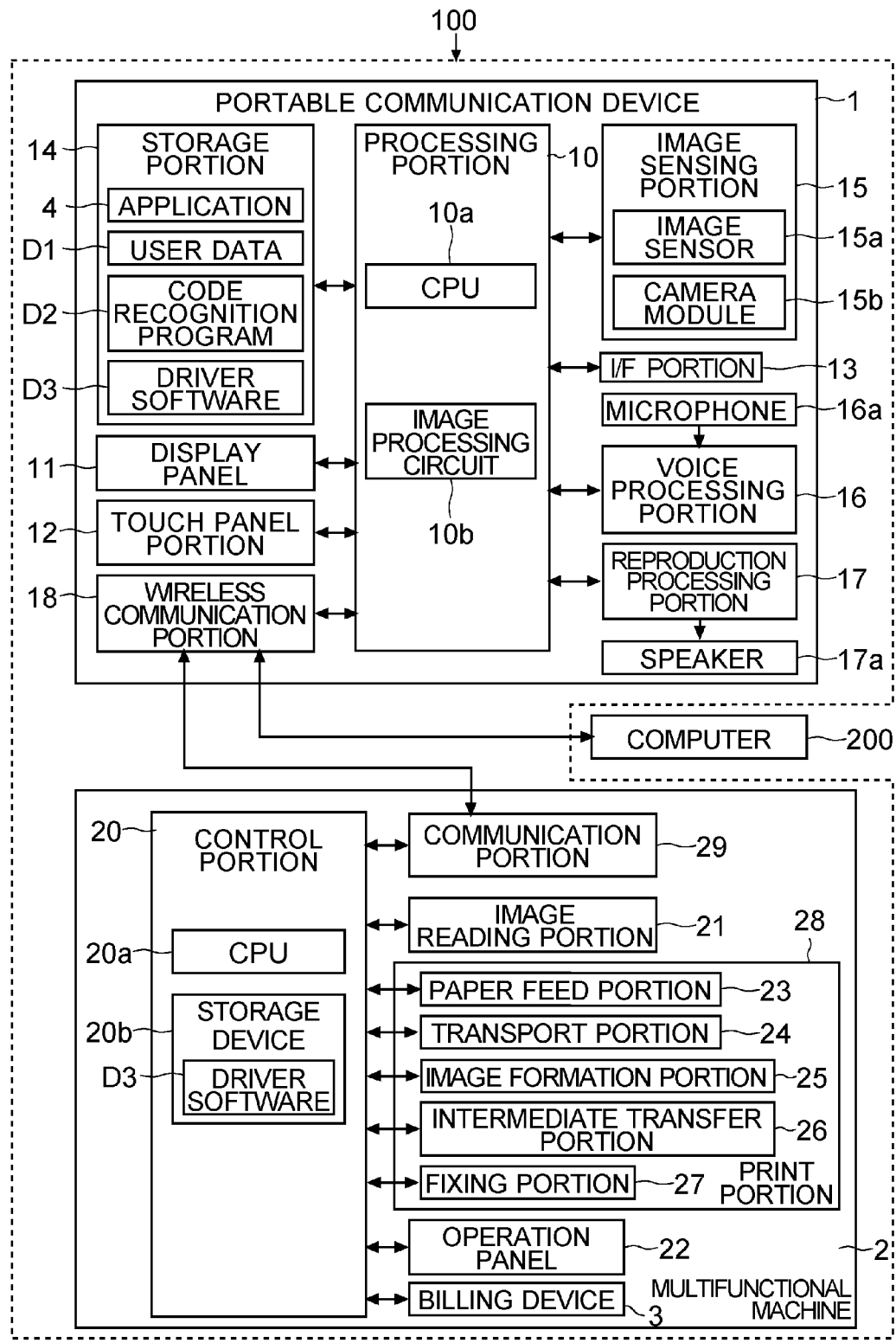
FIG. 3 is a diagram showing an example of the hardware of the image forming system according to the embodiment.

The hardware configuration of the image forming system 100 according to the embodiment will then be described with reference to FIG. 3.

Within the multifunctional peripheral 2, a control portion 20 is provided. The control portion 20 performs control on the operation of the multifunctional peripheral 2. The control portion 20 includes a CPU 20a and a storage device 20b. The CPU 20a controls the individual portions of the multifunctional peripheral 2 based on control programs and control data stored in the storage device 20b. The storage device 20b is formed by combining devices such as a ROM, a RAM and a HDD. The storage device 20b stores various types of data such as the control programs, the control data, setting data and image data for the multifunctional peripheral 2. The control portion 20 is connected through a signal line or a bus to portions such as the print portion 28 (the paper feed portion 23, the transport portion 24, the image formation portion 25, the intermediate transfer portion 26 and the fixing portion 27), the operation panel 22 and the image reading portion 21, and controls the operations thereof.

The control portion 20 is connected to a communication portion 29 that includes an antenna and a circuit for wirelessly communicating with the portable communication device 1. The communication portion 29 performs data communication with a wireless communication portion 18 of the portable communication device 1 wirelessly (by radio waves). The communication portion 29 receives print data including image data and setting data on printing from the portable communication device 1. The control portion 20 controls, based on the received print data, the print portion 28 to make it perform printing. In order to provide driver software D3 for the multifunctional peripheral 2 to the portable communication device 1, the control portion 20 makes the communication portion 29 transmit, to the portable communication device 1, driver software D3 that is driver software D3 for the own device and that corresponds to the OS of the portable communication device 1. The driver software D3 is stored in the storage device 20b.

On the other hand, the portable communication device 1 includes a processing portion 10, an I/F portion 13, a storage portion 14 including a ROM, RAM and a flash memory, the display panel 11, the touch panel portion 12, the image sensing portion 15, a voice processing portion 16, a microphone 16a, a reproduction processing portion 17, a speaker 17a and the wireless communication portion 18.

The processing portion 10 is a circuit that controls the operation of the portable communication device 1. The processing portion 10 includes a CPU 10a and an image processing portion 10b. As the processing portion 10, an integrated circuit into which the CPU 10a and the image processing portion 10b are integrated as one chip can be used. The CPU 10a controls the operation of the portable communication device 1 based on the OS, the program, the application 4 and the data of the portable communication device 1. The image processing portion 10b performs image processing on image data. For example, the image processing portion 10b performs image processing on image data obtained by shooting with the image sensing portion 15, and displays the result of the processing on the display panel 11.

The storage portion 14 stores various types of data such as the control program, the control data, the application 4 and the image data of the portable communication device 1. The processing portion 10 controls the individual portions of the portable communication device 1 according to the control program, the control data and the application 4 stored in the storage portion 14. The downloaded application 4 can be stored in the storage portion 14. Although in FIG. 3, for convenience, only one application is shown, a plurality of applications 4 may be used. According to an requirement of starting up the application 4 through the touch panel portion 12 by the user, the processing portion 10 reads the application 4 from the storage portion 14 and executes it. As the applications 4, an application for the multifunctional peripheral 2 and an application for using the image sensing portion 15 to shoot a photograph are present.

The display panel 11 displays various types of information according to a requirement from the processing portion 10. The touch panel portion 12 is connected to the processing portion 10. The processing portion 10 recognizes a touched position based on the output of the touch panel portion 12. The processing portion 10 recognizes an image touched among operation images such as an icon, a button and a key displayed on the display panel 11. The operation images are pressed, and thus it is possible to start up and utilize the desired application 4 and make a telephone call.

On the I/F portion 13, a connector, a socket and a communication chip based on various types of standards are mounted. The I/F portion 13 reads data stored in a recording medium such as a memory card which is inserted thereinto and writes data over the recording medium.

The image sensing portion 15 is a camera that is provided in the portable communication device 1. The image sensing portion 15 includes a lens, an image sensor 15a and a camera module 15b that generates image data based on a signal output by the image sensor 15a. The camera module 15b includes: an AFE (Analog Front End) that processes an analog signal output by the image sensor 15a to generate digital image data; and a digital signal processor that processes the digital image data generated by the AFE. The image data obtained by shooting with the image sensing portion 15 is stored in the storage portion 14.

The wireless communication portion 18 includes an antenna and a communication circuit. The wireless communication portion 18 exchanges (communicates) data with the communication portion 29 of the multifunctional peripheral 2. The wireless communication portion 18 and the communication portion 29 of the multifunctional peripheral 2 perform data communication based on wireless communication standards such as Bluetooth or a wireless LAN. The wireless communication portion 18 can access, according to an instruction from the processing portion 10, a data communication line or a telephone line provided by a mobile communication operator. Through the wireless communication portion 18, it is possible to download the application 4, exchange data with the outside and make a telephone call with the other party.

The voice processing portion 16 performs signal processing on a voice input from the microphone 16a such that the voice has a form which can be transmitted from the wireless communication portion 18. The reproduction processing portion 17 reproduces, with the speaker 17a, voice data on the other party received by the wireless communication portion 18.

(Setting of Multifunctional Peripheral 2 with Portable Communication Device 1)

The setting of the multifunctional peripheral 2 with the portable communication device 1 according to the embodiment will then be described with reference to FIGS. 4 and 5.

In the multifunctional peripheral 2, the operation panel 22 is provided. An input is produced to the operation panel 22, and thus it is possible to select a function (the type of job executed) used among the functions of the multifunctional peripheral 2, to select a setting item provided for the selected function and to determine a setting value for the selected setting item. As described above, in the operation panel 22, it is possible to perform the selections and the setting of the setting value.

In the portable communication device 1, the application 4 for utilization of the image forming apparatus is used to perform the same selections and the same setting of the setting value as in the operation panel 22. The application 4 for utilization of the image forming apparatus is started up, and thus the processing portion 10 displays, on the display panel 11, the same or similar setting screen as or to the setting screen displayed on the operation panel 22, with the result that the input by the user is recognized based on the output of the touch panel portion 12.

Figures 4, 5:
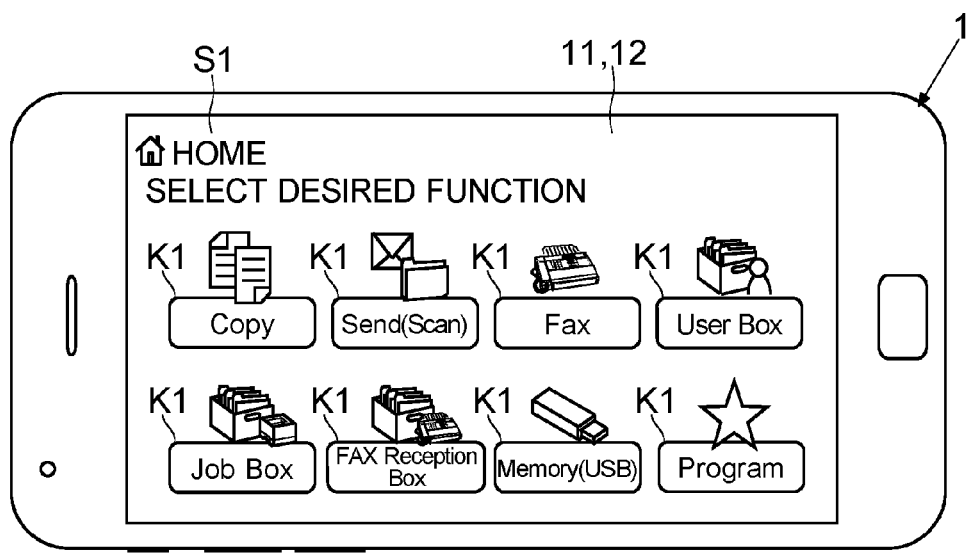
FIG. 4 shows an example of the setting screen of the multifunctional machine displayed on a portable communication device according to the embodiment.
FIG. 5 is a diagram showing an example of user data according to the embodiment.

FIG. 4 shows an example of a home menu screen S1 that is first displayed when the application 4 for utilization of the image forming apparatus is started up. On the home menu screen S1, function selection keys K1 for selection of a function used among the functions of the multifunctional peripheral 2 are displayed. The function selection key K1 is formed with a character string indicting a function name and an image attached to the function name. In an example shown in FIG. 4, the total of eight function selection keys K1 are provided.

When the function selection key K1 is operated, the processing portion 10 displays, on the display panel 11, a screen for performing a setting on the selected function. For example, when the function selection key K1 corresponding to a copying function is operated, the processing portion 10 displays, on the display panel 11, a screen for selection of a setting item on the copying function and a screen for inputting of a setting value.

When information indicating the execution of a job is input to the touch panel portion 12, the processing portion 10 makes the wireless communication portion 18 transmit, to the communication portion 29 of the multifunctional peripheral 2, data for execution of the job of a setting value set in the portable communication device 1 by the user. The control portion 20 of the multifunctional peripheral 2 operates, based on the received data, a portion necessary for execution of the job to execute the job. For example, when the control portion 20 receives print data including the setting value of a copy job, the control portion 20 operates the print portion 28 and the image reading portion 21 for copying.

In the application 4 for utilization of the image forming apparatus, personal information on the user of the portable communication device 1 can be registered. It is possible to determine, as necessary, what item is registered as the personal information. In the portable communication device 1 of the present embodiment, the personal information is used for printing an application form. Hence, in the portable communication device 1, the items, such as a name, an address, a postal code and a telephone number, that need to be entered in the application form can be registered as the personal information. FIG. 5 shows an example of user data D1 registered (stored) in the portable communication device 1.

When a predetermined operation is performed while the application 4 for utilization of the image forming apparatus is being started up, the processing portion 10 displays a screen (not shown) for inputting of the personal information on the display panel 11. Then, the processing portion 10 displays a software keyboard (not shown) on the display panel 11, and receives an input for each item (personal information) to the software keyboard. Then, when an operation indicating that the input of the personal information is completed is performed, the processing portion 10 stores the details of each item input, as the user data D1 (personal information), in the storage portion 14.

(Reading of QR Code 5)

Reading of the QR code 5 will then be described with reference to FIG. 6.

The portable communication device 1 of the present embodiment can recognize information stored in the QR code 5 based on image data obtained by shooting the QR code 5. In other words, the portable communication device 1 of the present embodiment can read the QR code 5.

In some brochures P and advertisements placed in stores and facilities, QR codes 5 are shown that store the liked destinations (addresses and URLs) of sites and data on events and products. The QR code 5 is read, and thus the user can display, on the display panel 11, a screen corresponding to an address described in the advertisement or the brochure P.

Figure 6:
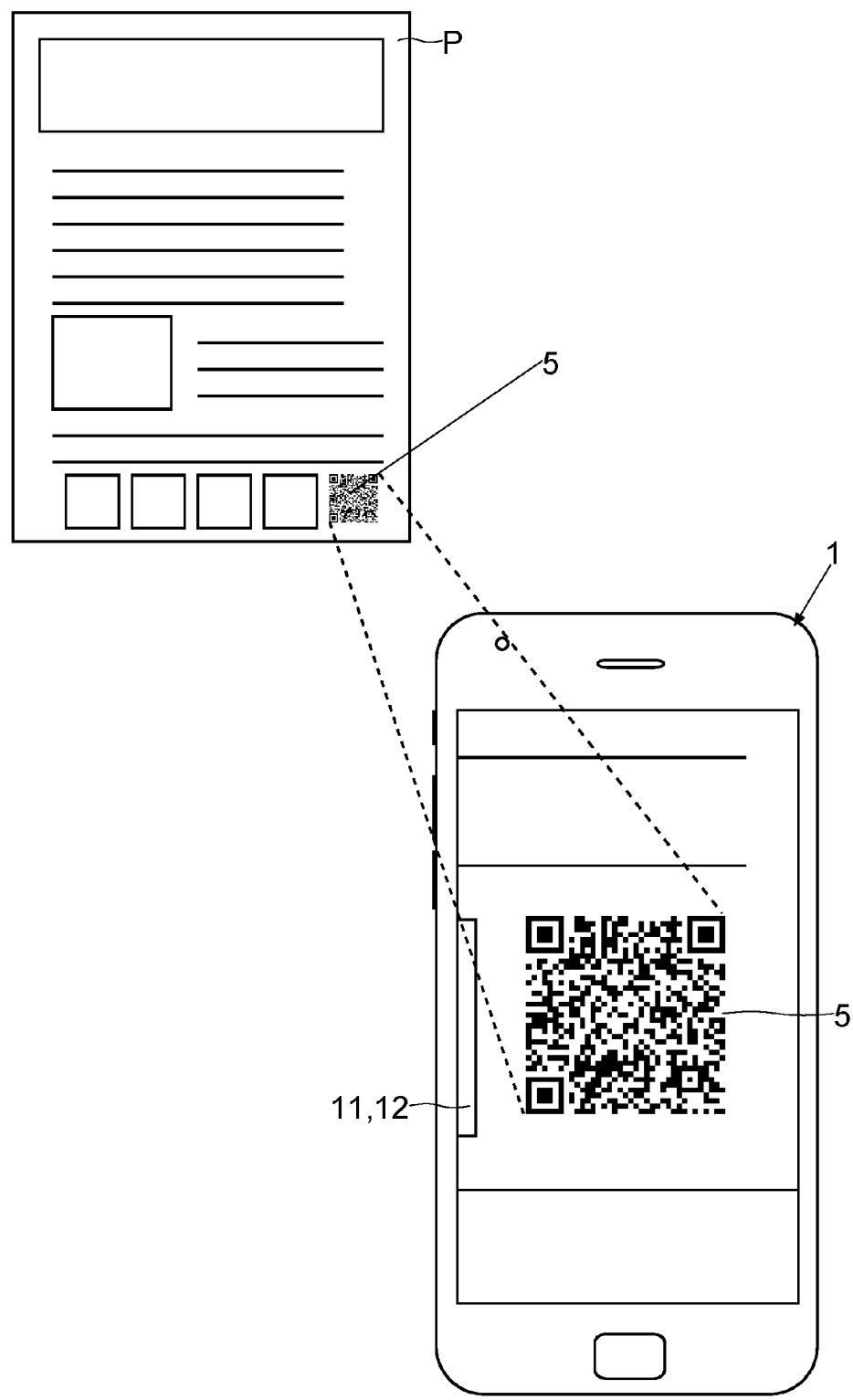
FIG. 6 is a diagram showing an example of the reading of a QR code in the portable communication device according to the embodiment.

The diagram on the upper side in FIG. 6 shows an example of the brochure P. In the brochure P shown in FIG. 6, a QR code 5 is printed. When the QR code 5 is read, the user starts up an application 4 (hereinafter referred to as a camera application) for shooting a photograph. Then, the user shoots the QR code 5 with the image sensing portion 15 such that the QR code 5 serving as a subject is placed within a frame. The storage portion 14 stores a code recognition program D2 for performing reading processing on information stored in the QR code 5 (see FIG. 3). The processing portion 10 recognizes the information stored in the QR code 5 based on the code recognition program D2 and the image data obtained by shooting the QR code 5.

(Acquisition of Predetermined Data Based on Reading of QR Code 5)

A flow from the reading of the QR code 5 to the acquisition of data on an application form based on an address stored in the QR code 5 will then be described with reference to FIGS. 7 and 8.

Figure 7:
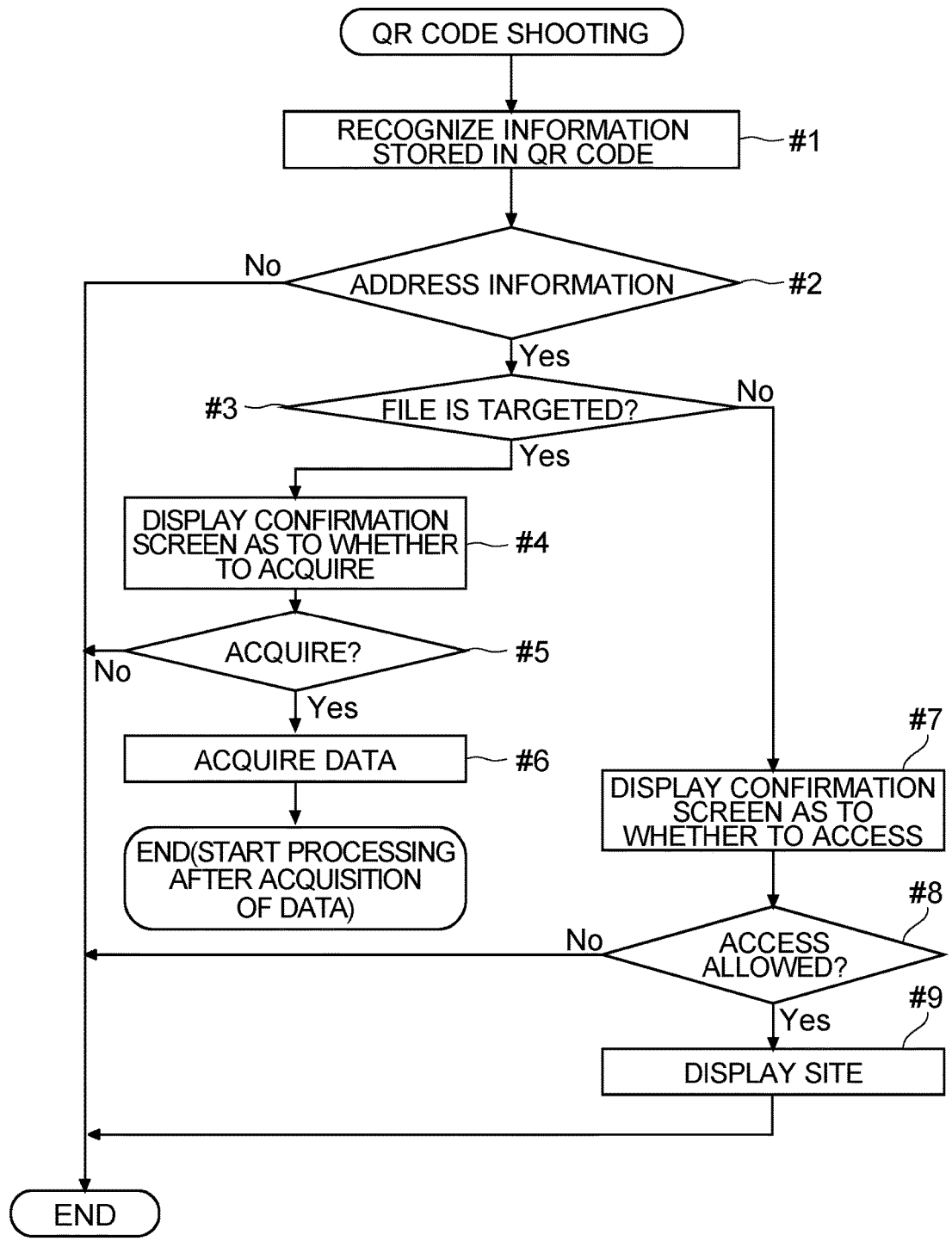
FIG. 7 is a flowchart showing an example of the flow until the acquisition of data on an application form based on an address stored in the QR code after the reading of the QR code.

The start of FIG. 7 is when the camera application for reading the QR code 5 is started up, the user shoots the QR code 5 and the image data including the QR code 5 is acquired based on the shooting.

The processing portion 10 recognizes the information stored in the QR code 5 read based on the image data including the QR code 5 and the code recognition program D2 (step #1). The processing portion 10 recognizes whether or not the information stored in the QR code 5 includes an address (step #2). When words such as "http://" that are often used as an address (URL or the position of the resource) are included, the processing portion 10 determines that the information stored in the QR code 5 includes an address. The processing portion 10 may determine, in another procedure, whether or not the information stored in the QR code 5 includes an address. Data that defines words often used as addresses is stored in the storage portion 14.

When the QR code 5 does not include an address (no in step #2), the information included in the QR code 5 is recognized not to be related to communication using the portable communication device 1 or the utilization of the function of the multifunctional peripheral 2. Hence, the present flow is completed (end).

Then, when an address is included in the QR code 5 (yes in step #2), the processing portion 10 determines whether or not the information stored in the QR code 5 is an address targeted for a predetermined type of data (predetermined data, that is, a file of a predetermined format) (step #3). In other words, the processing portion 10 confirms whether or not data present in a position described in the address included in the QR code 5 is data (predetermined data) of a format used in data on an application form. The file format of the predetermined data is, for example, image data or an electronic document.

When the information stored in the QR code 5 includes an acquisition target character string, the processing portion 10 determines that the information stored in the QR code 5 is an address targeted for the predetermined data. For example, a character string such as "http://~.pdf" or "http://~.jpg" that is often used when the file of an image or an electronic document is placed on the network 300 is assumed to be the acquisition target character string. The storage portion 14 stores data that defines a plurality of acquisition target character strings. The processing portion 10 makes a determination with reference to this data.

When the processing portion 10 accesses an address (the computer 200 indicated by the address) as a test, and the data format of the linked destination is a format of an image or an electronic document, the processing portion 10 may determine that the information stored in the QR code 5 is an address targeted for the predetermined data. The processing portion 10 may determine, in another procedure, whether or not the information stored in the QR code 5 is an address targeted for the predetermined data.

Figure 8:
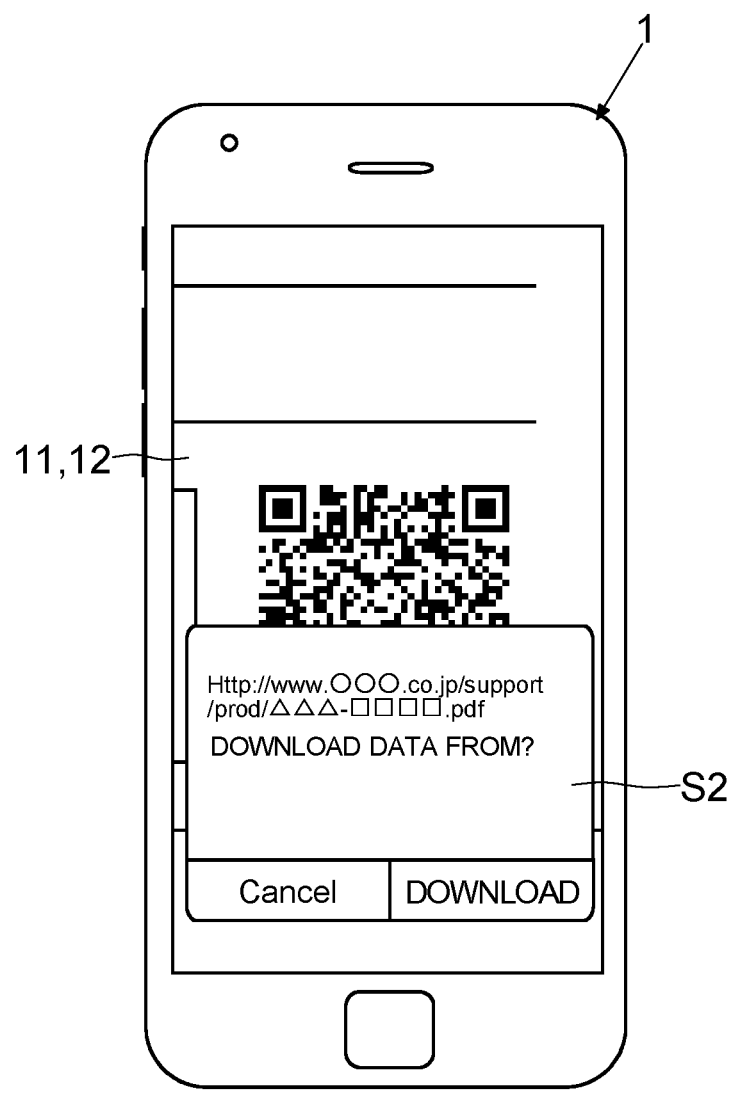
FIG. 8 is a diagram showing an example of the screen displayed when the QR code is read.

When the processing portion 10 determines that the information stored in the QR code 5 is an address targeted for the predetermined data (a file of the predetermined format) (yes in step #3), the processing portion 10 displays, on the display panel 11, a confirmation screen S2 as to whether the address may be accessed to acquire data (step #4, see FIG. 8). In the example of FIG. 8, when a touch operation is performed on the key including the character string "download", the processing portion 10 recognizes that the user inputs an instruction to acquire data from the position (the computer 200) described in the address. In the example of FIG. 8, when a touch operation is performed on the key including the character string "Cancel", the processing portion 10 recognizes that information that data is not acquired is input.

Figure 11:
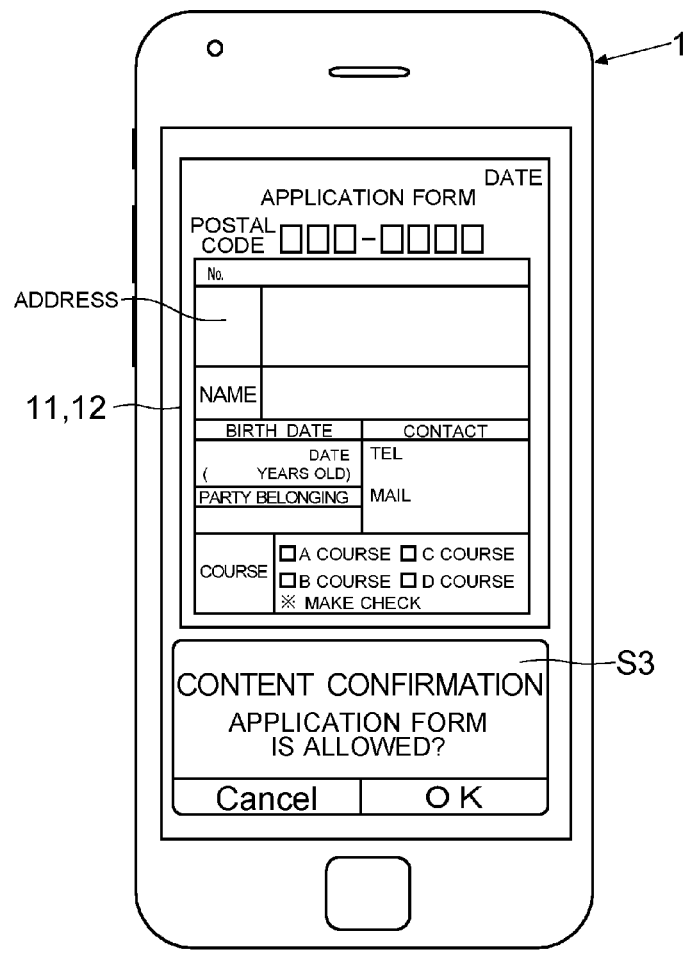
FIG. 11 is a diagram showing an example of the confirmation screen for confirming data acquired based on the address.
Figure 12:
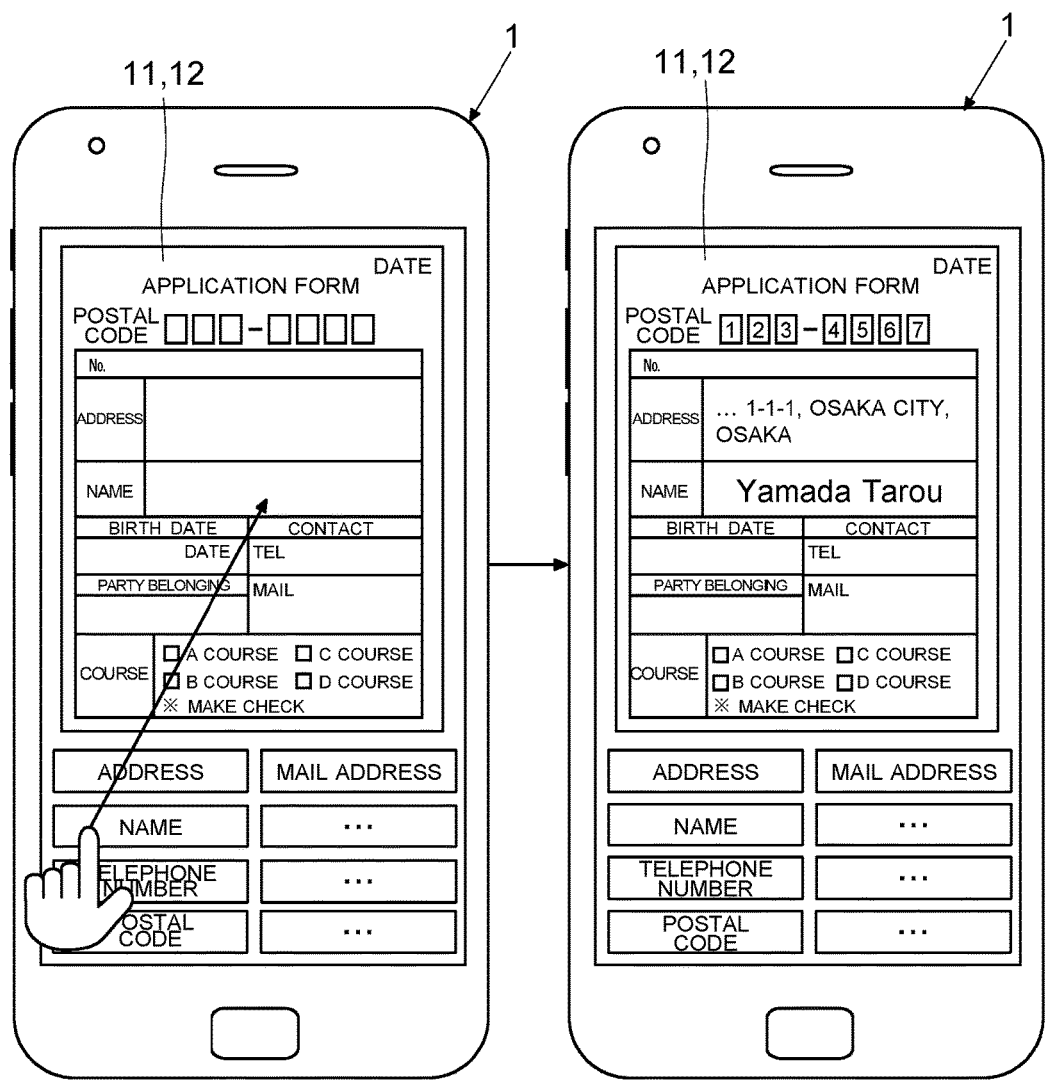
FIG. 12 is a diagram showing an example of an operation of adding personal information to the application form.

When the user does not input the information that data is acquired (no in step #5), the present flow is completed (end). On the other hand, when the processing portion 10 recognizes that based on the output of the touch panel portion 12, the information that data is acquired is input (yes in step #5), the processing portion 10 makes the wireless communication portion 18 access the address to acquire data (step #6). Consequently, the data on the application form is downloaded (an example of the application form is shown in FIGS. 11 and 12). Then, processing after the acquisition of the data is started (details of which will be described later).

On the other hand, when the processing portion 10 determines that the information (address) stored in the QR code 5 is not an address targeted for the predetermined data (file) (no in step #3), the processing portion 10 displays, on the display panel 11, a confirmation screen (not shown) as to whether or not the address stored in the QR code 5 may be accessed (step #7).

For example, when words such as "~.html" that are often used as the URL of a site are included in the information stored in the QR code 5, the processing portion 10 displays, on the display panel 11, a confirmation screen as to whether the site may be accessed to display the site.

When the processing portion 10 recognizes, based on the output of the touch panel portion 12, that the user inputs the information that the access is allowed (yes in step #8), the processing portion 10 makes the wireless communication portion 18 access the computer 200 indicated by the address to display the site on the display panel 11 (step #9). On the other hand, when the processing portion 10 recognizes that the user inputs the information that the access is not allowed (no in step #8), the present flow is completed.

(Flow of Processing after Acquisition of Data)

A flow of the processing after the acquisition of the data in the portable communication device 1 according to the embodiment will then be described with reference to FIGS. 9 to 12.

Figure 9:
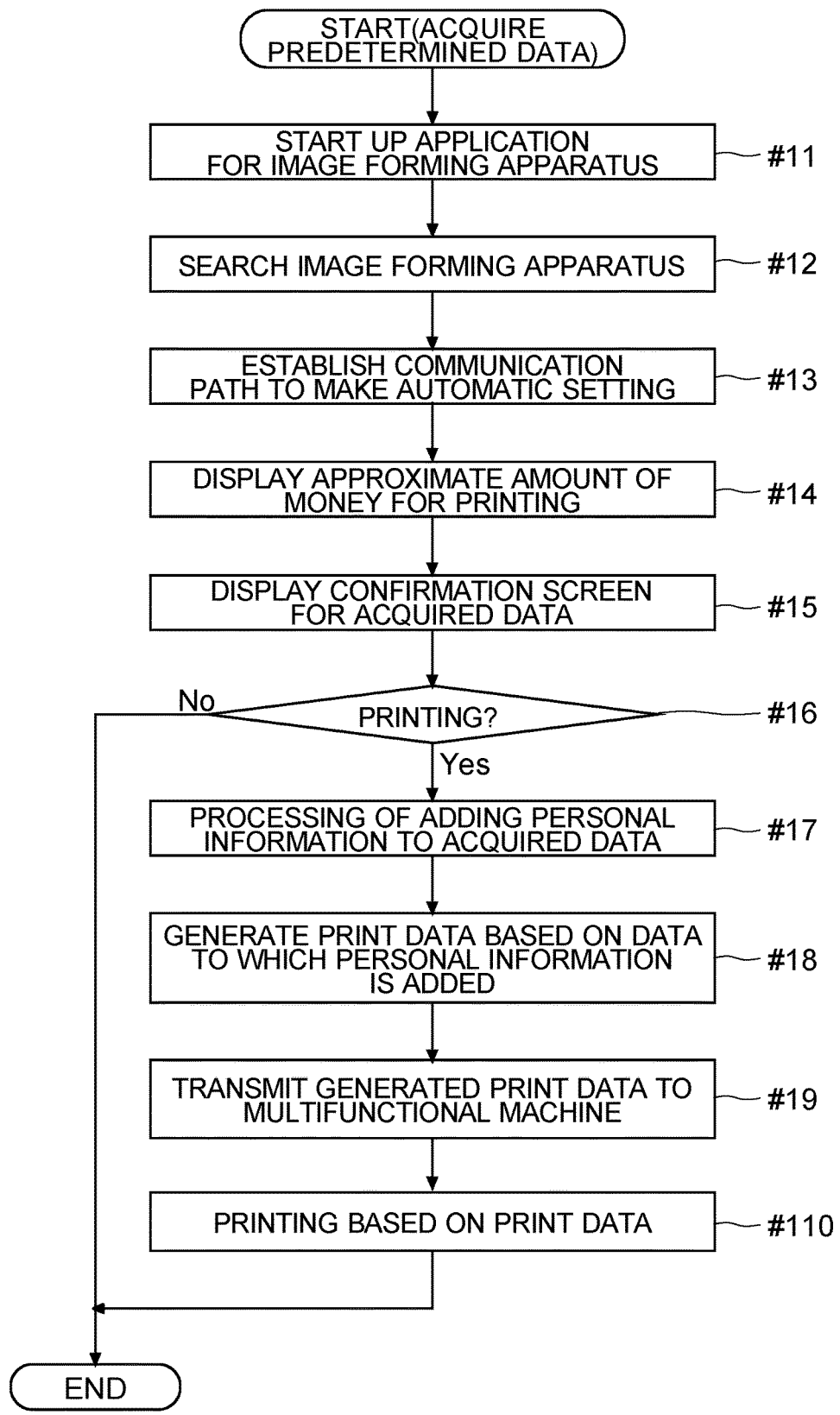
FIG. 9 is a flowchart showing an example of the flow of processing in the image forming system after the portable communication device according to the embodiment acquires data.

The start of FIG. 9 is when the QR code 5 is shot and the predetermined data is acquired. The processing portion 10 automatically starts up an application 4 for setting the image forming apparatus (step #11). Even when after the reading of the QR code 5, the site is displayed on the display panel 11, and the predetermined data (a file of the predetermined format) is acquired by performing an operation on the site, the processing portion 10 may automatically start up the application 4 for utilizing the image forming apparatus to start the flowchart of FIG. 9.

Then, the processing portion 10 makes the wireless communication portion 18 search for the image forming apparatus (in the example of the present embodiment, the multifunctional peripheral 2) within a predetermined range (step #12). Specifically, the processing portion 10 makes the communication circuit of Bluetooth or wireless LAN in the wireless communication portion 18 search for the image forming apparatus. As the image forming apparatus to be searched for, the image forming apparatus within the effective range of Bluetooth or wireless LAN is searched for. After the QR code 5 of a brochure P or an advertisement placed in a store or a facility is shot, a nearby image forming apparatus is detected. For example, when the QR code 5 of a brochure P placed in a certain store is shot, and thus data is acquired, an image forming apparatus placed in a store such as a business convenience store or a convenience store, a commercial facility, a public facility, an event venue or the like is detected. In the following description, an example where as the image forming apparatus, the multifunctional peripheral 2 described above is detected is used.

Then, the processing portion 10 makes the wireless communication portion 18 communicate with the communication portion 29 of the multifunctional peripheral 2, establishes a communication path and performs automatic setting processing (step #13). In a store such as a business convenience store or a convenience store, a commercial facility, a public facility, an event venue or the like, a plurality of image forming apparatuses may be placed. When the wireless communication portion 18 detects a plurality of image forming apparatuses, the processing portion 10 displays, on the display panel 11, a list of the detected image forming apparatuses, makes the wireless communication portion 18 establish a communication path with the selected image forming apparatus and performs the automatic setting processing for allowing the selected image forming apparatus to be used. In the present embodiment, an example where the processing portion 10 establishes communication with the multifunctional peripheral 2 will be described.

Programs for establishing the communication and performing a series of processing steps in the automatic setting are stored in the storage portion 14. The processing portion 10 performs the programs to make the wireless communication portion 18 sequentially acquire information such as the predetermined specifications of the multifunctional peripheral 2 such as the communication system of the multifunctional peripheral 2, the profile applied, the machine name, the serial number, the print speed and the support for color, the remaining number of sheets and the remaining amount of toner. Then, the processing portion 10 sequentially performs the automatic setting processing for allowing the setting of the multifunctional peripheral 2 to be performed in the portable communication device 1. For example, when the driver software D3 for the detected multifunctional peripheral 2 is not present in the storage portion 14, the processing portion 10 makes the wireless communication portion 18 acquire the driver software D3 for the multifunctional peripheral 2 stored in the storage device 20b of the multifunctional peripheral 2. The driver software D3 may be acquired from the computer 200 such as a server on the network 300.

Figure 10:
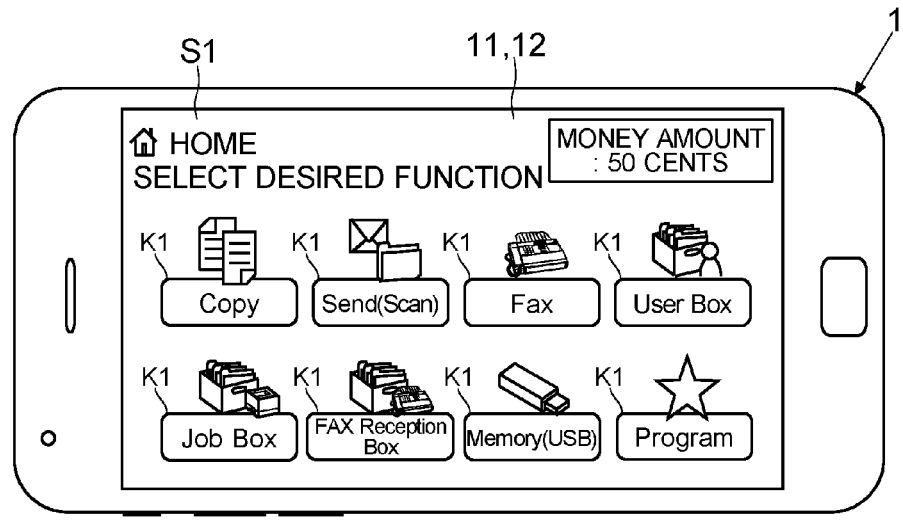
FIG. 10 is a diagram showing an example of the screen when an application for printing in a multifunctional machine is started up.

Then, the processing portion 10 displays, on the display panel 11, an approximate amount of money necessary for the printing of the acquired data (step #14, see FIG. 10). Since an approximate amount is displayed, the amount of money may be a fixed value. By the communication between the wireless communication portion 18 and the multifunctional peripheral 2, the processing portion 10 recognizes the specifications of the multifunctional peripheral 2. Hence, the amount of money may be changed depending on the specifications of the detected image forming apparatus, and for example, when the detected image forming apparatus is a monochrome machine, the amount of money is 50 cents or when it is a color machine, the amount of money is 1 dollar.

Then, the processing portion 10 displays a confirmation screen S3 of the acquired data on the display panel 11 (step #15, see FIG. 11). The processing portion 10 displays, within the confirmation screen S3, the data on an image, an electronic document or the like acquired. In this way, the user can confirm whether or not the acquired data is an application form.

As shown in FIG. 11, the processing portion 10 displays, within the confirmation screen S3, a selection key as to whether or not the acquired data is accepted. When a touch operation is performed on the key including "OK", the processing portion 10 recognizes that information that printing is performed using the acquired data is input by the user. When a touch operation is performed on the key including "Cancel", the processing portion 10 recognizes that information that printing is not performed using the acquired data is input by the user.

When an operation is performed within the confirmation screen S3, and the function selection key K1 on the printing such as copying is operated in a state where the screen is returned to the home menu screen S1, the processing portion 10 may recognize that information that printing is performed using the acquired data is input by the user. In other words, in the confirmation screen S3, only the details of the acquired data are displayed. An instruction to perform printing based on data acquired on another screen may be accepted.

When the information that printing is not performed is input (no in step #16), the present flow is completed. On the other hand, when the information that printing is performed is input (yes in step #16), the processing portion 10 performs processing for adding personal information to the acquired data (data on the application form) (step #17).

In the portable communication device 1, the user can specify (determine) which item of the user data D1 (registered personal information) fills in a position (column) corresponding thereto. Hence, the processing portion 10 recognizes the column within the acquired data. Various methods can be used as a method of recognizing the column. For example, in order to recognize the column, the processing portion 10 performs binarization processing on individual pixels within the screen of the acquired data. Then, the processing portion 10 extracts, in each of the row direction (horizontal direction) and the column direction (vertical direction) of a page, a straight line (high-density line) in which black pixels of a threshold value or above are continuous. Then, the processing portion 10 recognizes that a region (where the four sides of a region are surrounded by the straight lines) enclosed by the extracted straight lines is the column.

Then, the processing portion 10 displays, on the display panel 11, the keys including the item names included in the personal information. The display panel 11 displays a plurality of keys including the item names of the personal information below the image of the acquired data (application form). In FIG. 12, as the examples of the items of the personal information, an address, a name, a telephone number, a postal code, a mail address and the like are shown.

Then, the user performs an operation of specifying an item by touching any one of the keys, moving a touch position to a column (column in which the item corresponding to the selected key needs to be entered) which it is desired to fill in with the details of the specified item and separating it. The processing portion 10 recognizes that the column of the position where the finger is separated is specified. Then, the processing portion 10 performs processing for adding the details (in the case of the address, the address of the registered user) of the specified item to the specified column. For example, the processing portion 10 writes the character sting determined as the details of the specified item over the pixel within the specified column.

The diagram on the left side of FIG. 12 shows an example where the key of the name is touched, the touch position is moved to slide to the entry column of the name and thereafter the operation of separating the finger is performed. The diagram on the right side of FIG. 12 shows a state where the details of the items of the user data D1 (registered personal information) are added to the individual columns of the application form. As described above, the processing portion 10 recognizes in which columns the items of the personal information are included based on the output of the touch panel portion 12.

Instead of the operation performed by the user, the processing portion 10 may automatically add the details of the items of the personal information into the columns of the data of the application form. In this case, the processing portion 10 recognizes the columns in the data of the application form acquired. Then, the processing portion 10 performs OCR processing for each of the columns to recognize a blank column, a column where a character string is included and the character string included in the column. Software necessary for the OCR processing is previously stored in the storage portion 14.

Then, the processing portion 10 recognizes, for the blank column, a column (for example, the column on the left side) which is adjacent thereto and which includes characters. Then, the processing portion 10 writes, over the blank column, the details (registered character string) of the item corresponding to the character string included in the adjacent column. As described above, the blank column is first filled in. Then, the processing portion 10 recognizes, among the character strings included in the columns other than the blank column, a column corresponding to the item name of the personal information (except the item entered in the blank column). Then, the processing portion 10 writes the details of the corresponding item over the region within the column including the character string corresponding to the item name of the personal information. FIG. 12 shows an example where a character string "Yamada Tarou" is written over the column of the "name".

The method of adding (entering) the details (personal information) of the individual items automatically registered to the data on the application form is not limited to the method described above, and another method may be adopted.

Then, the processing portion 10 generates print data based on the data on the application form to which the personal information is added (step #18). The processing portion 10 includes data indicating the setting of printing performed by the portable communication device 1 and necessary image data in the print data so that the multifunctional peripheral 2 understands it. For example, the print data includes data that is described in a page description language which can be utilized in the multifunctional peripheral 2.

Then, the processing portion 10 makes the wireless communication portion 18 transmit the generated print data to the multifunctional peripheral 2 (step #19). Then, the control portion 20 makes the print portion 28 perform printing based on the print data received from the portable communication device 1 (the wireless communication portion 18) (step #110). Then, the present flow is completed.

In a brochure P or an advertisement, a QR-coded address (linked destination) may be printed, and it may be possible to obtain data on an application form based on the address. Hence, the portable communication device 1 according to the embodiment includes the image sensing portion 1, the display portion (the display panel 11), the touch panel portion 12, the storage portion 14, the wireless communication portion 18 and the processing portion 10. The display portion displays a screen. The touch panel portion 12 receives a touch operation on the display portion. The storage portion 14 stores the personal information on the user of the portable communication device 1. The wireless communication portion 18 transmits and receives data. The processing portion recognizes, based on image data generated by shooting a code display member (the QR code 5) with the image sensing portion 15, an address included in the code display member, makes the wireless communication portion 18 acquire data in the address as data on an application form, adds the personal information to the data acquired by the wireless communication portion 18 to generate print data on the application form in which an item has been entered and makes the wireless communication portion 18 transmit the generated print data to the image forming apparatus (the multifunctional peripheral 2).

In this way, with the portable communication device 1 such as a smart phone or a tablet computer possessed, it is possible to acquire the data on the application form. Then, based on the acquired data, the application form can be printed with the image forming apparatus (the multifunctional peripheral 2) near the brochure P or the advertisement. Hence, at that place, the user can apply for a desired event or product. Moreover, the user can easily obtain an application form in which necessary items such as the address and the name have been printed. Thus, it is possible for the user to omit a bothersome action of filling in the application form.

It can be considered that in a place where an event, a service or a product is announced or reserved, the organizer of the event, the provider of the service or the seller of the product prepares for image forming apparatuses. In this way, the user easily can apply for the event or product. Moreover, it is extremely easy even for the organizer, the provider or the seller to receive the application, and thus a large number of applications can easily be handled.

An address included in a code shown in a brochure P or an advertisement may be an address of a webpage (homepage) for information provision. Even when the webpage is printed, it cannot be used as an application form. Hence, the processing portion 10 determines, based on the address, whether or not the data present in the address included in the code display member (the QR code 5) is predetermined data that is previously determined type of data, and when the data present in the address is the predetermined data, the processing portion 10 makes the wireless communication portion 18 acquire the data present in the address whereas when the data present in the address is not the predetermined data, the print data is not generated based on the data present in the address.

In this way, when the acquired data is data (details) which is not an application form, a print job is prevented from being performed based on the acquired data. Thus, it is possible to reduce the wasteful consumption of resources such as sheets, toners and power.

When the processing portion 10 makes the wireless communication portion 18 acquire the data present in the address as the data on the application form, the processing portion 10 makes the wireless communication portion 18 search for the image forming apparatus (the multifunctional peripheral 2) present within a predetermined range, makes the wireless communication portion 18 establish communication with the detected image forming apparatus and makes the wireless communication portion 18 transmit the print data to the image forming apparatus where the communication is established.

In this way, the nearby image forming apparatus (the multifunctional peripheral 2) which is found by the search and in which the communication is established can be made to print the application form, and thus the user can immediately acquire the application form.

When the wireless communication portion 18 establishes communication with the image forming apparatus (the multifunctional peripheral 2), the processing portion 10 displays, on the display portion (the display panel 11), the amount of money necessary for printing of the print data. In this way, it is possible to notify the user of the fact that money may be needed when the application form is printed in the image forming apparatus (the multifunctional peripheral 2).

When the processing portion 10 displays, on the display portion (the display panel 11), the confirmation screen S3 for confirming the data acquired by the wireless communication portion 18, and information that printing is performed based on the acquired data is input to the touch panel portion 12, the processing portion 10 generates the print data whereas when information that printing is not performed based on the acquired data is input to the touch panel portion 12, the processing portion 10 does not generate the print data.

In this way, the user can actually confirm the details of data obtained from the position described in the address. When an application form itself is not displayed, the user only instructs the nearby image forming apparatus (the multifunctional peripheral 2) to perform printing, and thus the user can acquire the application form in which necessary items are entered. On the other hand, when a display other than an application form is produced, the user provides an instruction to prevent printing from being performed, and thus it is possible to prevent the image forming apparatus from performing wasteful printing.

The processing portion 10 recognizes the column included in the acquired data, displays the item of the personal information on the display portion (the display panel 11), recognizes an operation of specifying, based on an input to the touch panel portion 12, which item is included in a column corresponding thereto and generates the print data such that the specified item is included in the specified column.

In this way, the user can perform a setting in which an operation is performed to arrange the personal information such as the address and the name in appropriate places within the acquired data. Hence, the user can acquire the print of the application form without an entry mistake.

The processing portion 10 recognizes the address based on the image data generated in the image sensing portion 15 by sensing an image of the QR code included in the code display member. In this way, the user only shoots the QR code 5 with the image sensing portion 15 (camera) provided in the portable communication device 1, and thereby can obtain the data on the application form.

The image forming system 100 according to the embodiment includes the portable communication device 1 and the image forming apparatus (the multifunctional peripheral 2) described above. In this configuration, it is possible to provide the image forming system 100 where the application form in which necessary items are entered can be printed.

Although the embodiment of the present disclosure is described, the scope of the present disclosure is not limited to the embodiment, and various modifications are possible without departing from the spirit of the disclosure.

What is claimed is:

1. A portable communication device comprising:
   an image sensing portion;
   a display portion that displays a screen;
   a touch panel portion that receives a touch operation on the display portion;
   a storage portion that stores personal information on a user of the portable communication device;
   a wireless communication portion that transmits and receives data; and
   a processing portion that recognizes, based on image data generated by shooting a code display member with the image sensing portion, an address included in the code display member, that makes the wireless communication portion acquire data in the address as data on an application form, that adds the personal information to the data acquired by the wireless communication portion to generate print data on the application form in which an item has been entered and that makes the wireless communication portion transmit the generated print data to an image forming apparatus;
   wherein the processing portion determines, based on the address, whether or not the data present in the address included in the code display member is predetermined data that is previously determined type of data, and when the data present in the address is the predetermined data, the processing portion makes the wireless communication portion acquire the data present in the address whereas when the data present in the address is not the predetermined data, the print data is not generated based on the data present in the address; and
   wherein when the processing portion determines that the address included in the code display member is not targeted for the predetermined data, the processing portion displays, on the display portion, a confirmation screen as to whether or not the address stored in the code display member is allowed to be accessed whereas when the processing portion recognizes that an input in which the access is allowed is produced to the touch panel portion, the processing portion makes the wireless communication portion access a computer indicated by the address to display a site on the display portion.

2. The portable communication device according to claim 1,
   wherein the processing portion makes the wireless communication portion search for the image forming apparatus present within a predetermined range, makes the wireless communication portion establish communication with the detected image forming apparatus and makes the wireless communication portion transmit the print data to the image forming apparatus where the communication is established.

3. The portable communication device according to claim 2,
   wherein when the wireless communication portion establishes the communication with the image forming apparatus, the processing portion makes the wireless communication portion acquire information on the image forming apparatus and performs automatic setting processing which includes acquisition of driver software for the image forming apparatus for allowing the setting of the image forming apparatus to be performed in the portable communication device.

4. The portable communication device according to claim 1,
   wherein when the wireless communication portion establishes communication with the image forming apparatus, the processing portion displays, on the display portion, an amount of money necessary for printing of the print data.

5. The portable communication device according to claim 1,
   wherein the processing portion displays, on the display portion, a confirmation screen for confirming the data acquired by the wireless communication portion, when information that printing is performed based on the acquired data is input to the touch panel portion, the processing portion generates the print data whereas when information that printing is not performed based on the acquired data is input to the touch panel portion, the processing portion does not generate the print data.

6. The portable communication device according to claim 1,
   wherein the processing portion recognizes a column included in the acquired data, displays the item of the personal information on the display portion, recognizes an operation of specifying, based on an input to the touch panel portion, which item is included in a column corresponding thereto and generates the print data such that the specified item is included in the specified column.

7. The portable communication device according to claim 1,
   wherein the processing portion recognizes the address based on the image data generated in the image sensing portion by sensing an image of a Quick Response code included in the code display member.

8. An image forming system comprising:
   the portable communication device according to claim 1; and
   the image forming apparatus that performs printing based on the print data on the application form transmitted from the portable communication device.

9. A method of controlling a portable communication device, the method comprising:
   displaying a screen on a display portion;
   receiving a touch operation on the display portion;

storing personal information on a user of the portable communication device;

performing wireless communication to transmit and receive data;

recognizing, based on image data generated by shooting a code display member with an image sensing portion, an address included in the code display member;

acquiring data in the address as data on an application form by the wireless communication;

generating print data on the application form in which an item has been entered by adding the personal information to the acquired data;

transmitting the generated print data to an image forming apparatus;

determining, based on the address, whether or not the data present in the address included in the code display member is predetermined data that is previously determined type of data so that when the data present in the address is the predetermined data, the data present in the address is acquired by wireless communication, and when the data present in the address is not the predetermined data, the print data is not generated based on the data present in the address, on determining that the address included in the code display member is not targeted for the predetermined data, displaying a confirmation screen as to whether or not the address stored in the code display member is allowed to be accessed; and on recognizing an input in which the access is allowed, enabling access to a computer indicated by the address to display a site.

* * * * *